July 6, 1965 B. S. SAUTER 3,192,980
CAPTIVE FASTENER ASSEMBLY WITH ROTATION PREVENTION MEANS
Filed July 10, 1961 4 Sheets-Sheet 2
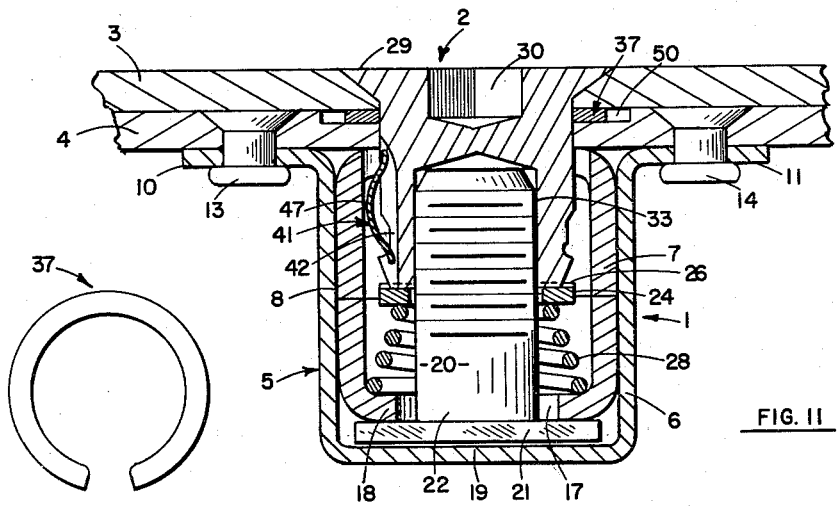
FIG. 11
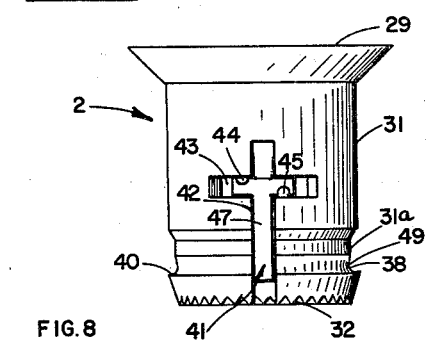
FIG. 7
FIG. 8
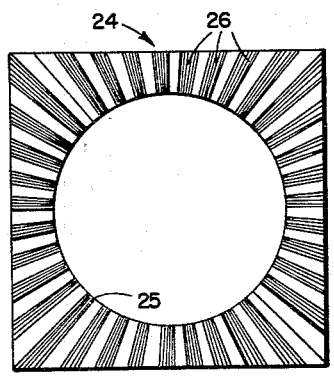
FIG. 5
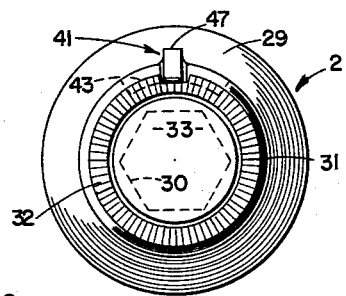
FIG. 9
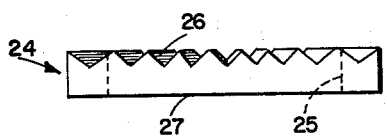
FIG. 6
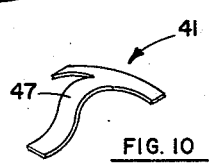
FIG. 10
INVENTOR.
BOBBIE S. SAUTER
BY
ATTORNEY

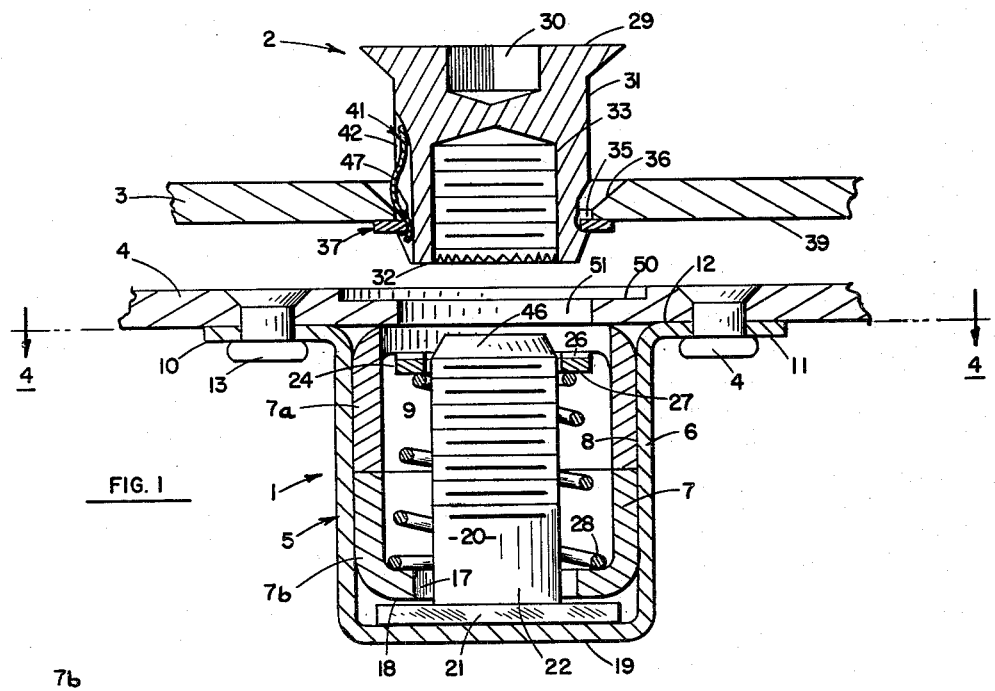

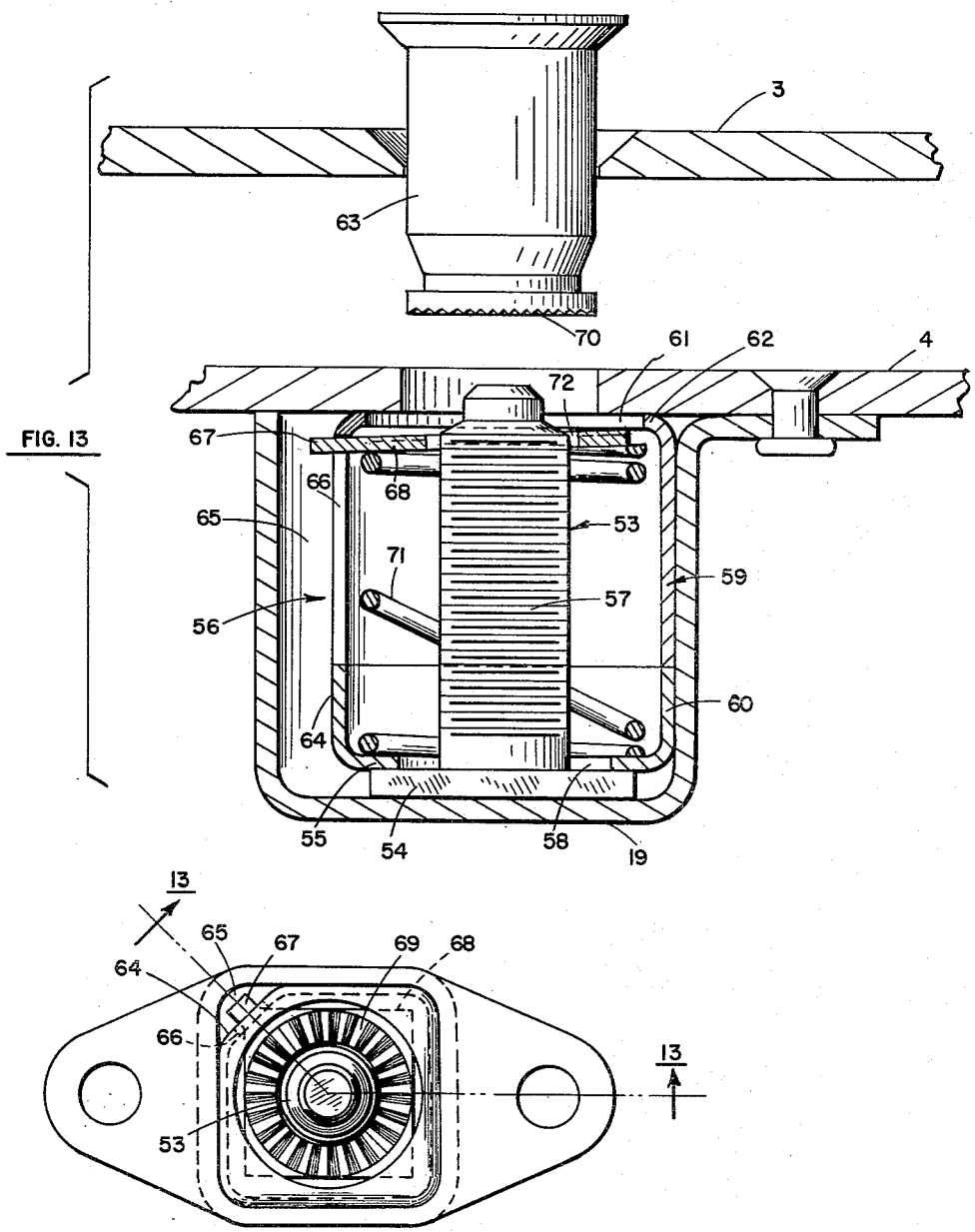

July 6, 1965  B. S. SAUTER  3,192,980
CAPTIVE FASTENER ASSEMBLY WITH ROTATION PREVENTION MEANS
Filed July 10, 1961  4 Sheets-Sheet 4
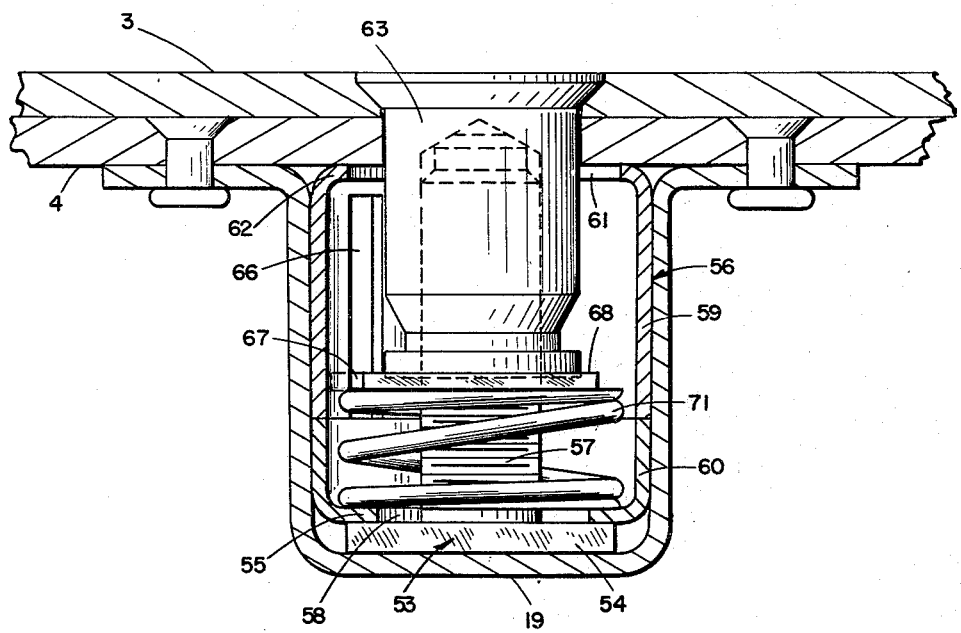
FIG. 16
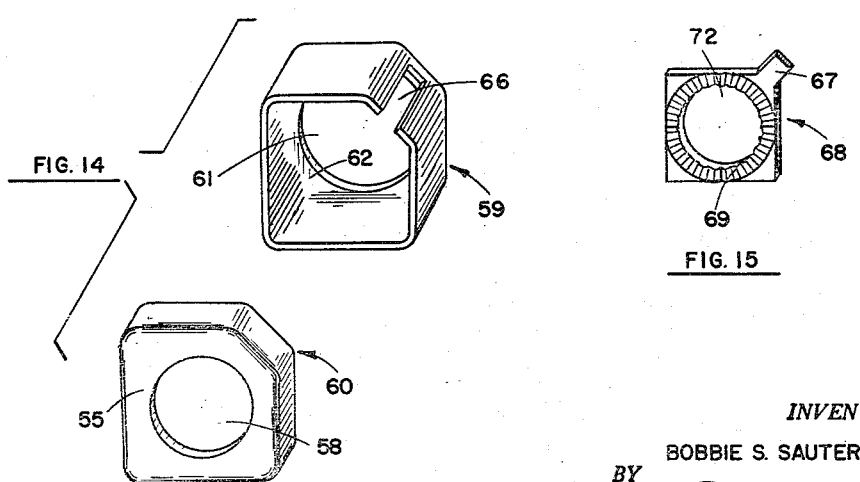
FIG. 14
FIG. 15
INVENTOR.
BOBBIE S. SAUTER
BY
ATTORNEY

United States Patent Office 3,192,980
Patented July 6, 1965

3,192,980
CAPTIVE FASTENER ASSEMBLY WITH ROTATION PREVENTION MEANS
Bobbie S. Sauter, Woodland Hills, Calif., assignor to Deutsch Fastener Corp., Los Angeles, Calif., a corporation of California
Filed July 10, 1961, Ser. No. 123,958
10 Claims. (Cl. 151—41.5)

This application is a continuation-in-part of my co-pending application Serial No. 806,065 for Fastener, filed April 13, 1959 and now abandoned.

This invention pertains to a fastener and more particularly to a self-locking threaded fastener.

The fastener of this invention is specially adapted for securing aircraft cowling or similar panels to adjacent structure, though not being limited to such purpose. The fastener is usable where it is necessary to carry sizable loads, including high loads in shear.

The general arrangement of the invention provides a nut which is adapted to be inserted through the members to be fastened for engaging a stud or bolt held at one side of one of these members. This positions the nut, which is of larger diameter than the stud, at the plane of shear thereby increasing the shear carrying capacity of the fastener. Also included is a spring on the nut which is expansible beyond the periphery of the nut for normally holding the head of the nut above the surface of the member with which it is associated when the fastener is disengaged. This provides a self-flagging feature which makes it at once apparent that the fastener has not yet been secured. The user of the fastener is thus warned of the condition and will not inadvertently fail to secure the fastener.

The stud or bolt portion of the fastener is held in a receptacle riveted to one side of the other member to be fastened. The stud has freedom for limited movement with respect to a receptacle, but is in a non-rotatable relationship therewith. A spring loaded ratchet-type lock member also is in the receptacle for engaging a complementary end portion of the nut when the fastener is assembled. The lock member provides a resistance to rotation so that the fastener will not become loosened when in use.

Therefore, it is an object of this invention to provide a fastener of great strength including high strength in shear.

Another object of this invention is to provide a fastener which is fast acting and self-locking.

A further object of this invention is to provide a fastener in which the head of the nut is held away from the surface of the member with which the nut is associated when the fastener has been released to avoid inadvertently leaving the fastener unsecured.

Yet another object of this invention is to provide a fastener in two separate assemblies, each of which is held to one of the members to be fastened when the fastener is released.

A still further object of this invention is to provide a fastener which will compensate for misalignment of parts.

An additional object of this invention is to provide a fastener which is simple to construct and operate, light weight and economical to produce.

These and other objects will become apparent from the following detailed description taken in connection with the accompanying drawing in which:

FIG. 1 is a sectional view of the fastener of the invention as associated with members to be secured together and as in the released position, FIG. 2 is a top plan view partially broken away of the inner receptacle of the stud assembly, FIG. 3 is a perspective view of the stud, FIG. 4 is a sectional view taken along line 4—4 of FIG. 1 showing the end portion of the stud assembly which is attached to one of the members to be fastened, FIG. 5 is a top plan view of the locking member of the stud assembly, FIG. 6 is a side elevational view of the arrangement of FIG. 5, FIG. 7 is a plan view of the nut-retaining ring, FIG. 8 is a side elevational view of the nut unit, FIG. 9 is a bottom plan view of the arrangement of FIG. 7, FIG. 10 is a perspective view of the flag spring for holding the head of the nut away from the member with which the nut is associated when the fastener is released, FIG. 11 is a sectional view illustrating the fastener in its assembled position, FIG. 12 is a top plan view of the stud assembly of a modified form of the invention where there is a positive means for preventing relative rotation of the nut and stud, FIG. 13 is a sectional view taken along line 13—13 of FIG. 12, and illustrating also the nut element with the fastener in its separated position, FIG. 14 is an exploded perspective view of the inner receptacle unit of the modified fastener, FIG. 15 is a perspective view of the ratchet washer with its projecting tab, and FIG. 16 is a sectional view similar to FIG. 13 with the fastener in its assembled position.

The fastener of this invention includes a stud assembly 1 and a nut assembly 2 which are associated with members to be secured together such as panel 3 adjacent structure 4 as illustrated. The stud assembly includes a receptacle unit 5 made up of an outer receptacle 6 which receives an inner receptacle 7. For convenience of manufacture the latter is formed in two sections 7a and 7b. Side walls 8 and 9 of these members are flat, preferably being square in cross section (see FIGS. 2 and 4), and member 6 retains member 7 by a frictional fit therebetween. Outer receptacle 6 includes a duality of outwardly projecting tabs 10 and 11 at its open upper end 12 which secure the stud assembly to member 4 by means of rivets 13 and 14.

Inner receptacle 7 is provided with a relatively large opening 15 in one end wall 16 while a smaller opening 17 extends through opposite end wall 18. End wall 16 of the inner receptacle is coterminous with end 12 of the outer receptacle, but the opposite end wall 18 of the inner receptacle is spaced from the parallel to end wall 19 of the outer receptacle. The bolt or stud 20, shown in perspective in FIG. 3 and in elevation in FIG. 1, has a flat, square head 21 from which threaded shank 22 extends at right angles. Head 21 fits between end walls 18 and 19 of the two receptacles with shank 22 extending through opening 17 into the interior of inner receptacle 7. The upper end of shank 22 is adjacent, but spaced inwardly from the upper end of the receptacle members. The parts are dimensioned so that the stud is free to float a limited amount within the receptacles, but is precluded from substantial rotation relative thereto. In other words, head 21 is of smaller lateral dimensions than the interior dimension of receptacle 6, while shank 22 likewise is smaller than the diameter of opening 17. Also, the thickness of head 21 is less than the spacing between end walls 18 and 19. This permits the stud to move within the limits provided by these clearances. On the other hand, the square configuration of head 21 within square receptacle 6 assures that stud 20 will not be permitted to rotate about its axis more than a very limited amount.

Lock member 24, shown in detail in FIGS. 5 and 6, also is received within inner receptacle 7. This lock member is in the form of a washer having a central opening 25 which receives shank 22 of the stud. The square outer contour of member 24 prevents its rotation within receptacle 7, but it is dimensioned for limited floating movement relative thereto. The upper surface of the lock member is provided with a plurality of shallow V-shaped radially extending teeth 26, the purpose of which will be made more clear hereinafter. Beneath member 24 and in engagement with its under surface 27 is a coil spring 28 which biases the lock member toward end wall 16 of the inner receptacle. When the fastener is in its disengaged position of FIG. 1, the corners of the lock member engage the end wall 16 as best seen in FIG. 4.

Nut 2 includes outwardly projecting head 29 at one end in which is a suitable driving recess 30. Shank 31 of the nut terminates at end 32 provided with serrations formed by shallow radial teeth matching in number and dimension the teeth 26 of the lock member. Extending axially into end 32 of the nut is a threaded opening 33 adapted to receive shank 22 of the stud. Shank 31 of the nut extends through opening 35 in member 3, which opening is countersunk at 36 to receive head 29 of the nut for flush type installations as in the embodiment shown.

With the fastener in the released position the nut is prevented from disengaging member 3 by means of a generally C-shaped split lock ring 37 illustrated in detail in FIG. 7. This lock ring has a free inner dimension less than the outer diameter of shank 31 of the nut. As a result when the nut is pushed upwardly relative to member 3, lock ring 37 contracts and enters circumferential recess 38 near end 32 of the nut. The width of ring 37 is such that the ring projects outwardly beyond the periphery of shank 31 of the nut and engages the under surface 39 of member 3 acting as a flange to prevent further axial movement of the nut. The substantially radial wall 40 at the bottom end of recess 38 assures that lock ring 37 will not be forced out of the recess in response to an upward force on the nut.

Retention of nut 2 in the position of Fig. 1, wherein head 29 of the nut is spaced from member 3, is effected by means of substantially T-shaped leaf spring 41 (see FIGS. 8, 9 and 10). This spring is received in axial slot 42 and its adjoining circumferential slot 43 in the shank of the nut. Spring 41 is held to the nut by suitable means such as tabs 44 and 45 extending over recess 43. With the spring so positioned within the recesses in the shank of the nut, it will in its free position project beyond the periphery of the shank because of the curved configuration of axially extending portion 47 of the spring. Therefore, when the nut is moved upwardly to the position of FIG. 1, the projecting portion 47 of the spring engages the side of opening 35 and retains the nut in this raised position. If members 3 and 4 have not been separated, the nut is raised automatically by the threads when it is backed off of the stud. With the nut raised, it is apparent from a glance at member 3 that the fastener has not been secured. This is a safety feature which assures that the fastener will not inadvertently be left unsecured.

In securing the fastener to the position of FIG. 11, nut 2 projects downwardly through member 3, threadably engaging shank 22 of the stud within threaded opening 33 of the nut. Preferably these are multiple lead threads to permit rapid tightening. Long chamfer 46 on the end of shank 22 assures entry into opening 33. The limited floating movement allowed the stud permits proper engagement of the parts even where there is some misalignment between the members being fastened. Additional floating by the nut is allowed by necked down portion 31a near bottom end 32 of the nut.

Spring 41 provides no intereference to the axial movement of the nut because when the nut is moved downwardly the wall of opening 35 forces the spring inwardly so that it is entirely received within recess 42 and can pass through the opening. Likewise, lock ring 37 does not preclude such movement of the nut, being merely expanded and forced out of slot 38 as the nut moves axially downward. Upper wall 49 of slot 38 inclines gradually toward head 29 so that lock ring 37 easily moves out of the slot when the nut is moved in this manner. Circumferential recess 50 in member 4 at the upper edge of opening 51 through that member receives lock ring 37 when the nut is assembled onto the stud. If desired, this type of recess could be provided in under surface 39 of member 3 instead of being placed in member 4, but for most installations a stronger and more satisfactory construction results if the recess is in member 3 as shown.

When end 32 of the nut passes through opening 51 of member 4, and the nut engages the stud within the receptacle members, a resistance to rotation of the nut is afforded by lock member 24. This results from the fact that this member is forced upwardly against end 32 of the nut by spring 28, urging teeth 26 in member 24 against the matching teeth of end 32 of the nut. A driving torque applied through recess 30 of the nut readily can overcome this resistance to rotation, causing the teeth to slip over each other as member 24 is forced downwardly when the nut enters the receptacle unit and receives the stud. When the nut is not being driven however, even before it is fully tightened, the teeth in the lock member 24 and in the end of the nut mesh to prevent the nut from loosening due to vibrations or other conditions encountered. Only a reverse driving torque applied through the head of the nut can effect a loosening of the nut from the stud. Otherwise, the ratchet type of engagement between the spring pressed lock member and the end of the nut acts as an interfering means which prevents rotation of the nut relative to the stud.

The teeth in lock mmeber 24 and the end of the nut not only provide an automatic locking of the fastener in its secured position, but also assist the operator in determining when the fastener is fully tightened. This is because the teeth slipping over each other communicate to the operator through both a sense of touch and an audible signal that the nut is rotatable relative to the stud and not yet tightened completely. The user of the fastener soon develops a much more acute sense of the exact relationship of the nut on the stud than is possible with conventional fasteners.

When the fastener is in the assembled position of FIG. 11, shank 31 closely engages the wall of opening 51, and portion 31a of reduced diameter then is within the receptacle unit. With the fastener in this position, it is the nut which extends through the members to be held and not the bolt as in conventional designs. The nut is naturally the larger in diameter of the two so that by this arrangement the member of greatest size is placed at the plane of shear. As a result the fastener of this invention realizes a strength advantage, which is of great importance in fastening stressed panels such as cowling included in present day aircraft. Thus, by no penalty of weight, and still with a simplified construction, the fastener of this invention is able to withstand higher forces than is true for previously used fasteners.

It can be seen, therefore, that I have provided a fastener of the self-locking type, quickly and simply used and including safety features not found in prior arrangements. This comes about not only from the ratchet-type lock arrangement, but also from the self-flagging feature of the nut and the manner in which the parts are retained to the members to be fastened even when the fastener is in its released and separated position. In addition, the fastener permits a floating movement of the stud while retaining this member against rotation, so that misalignment of the parts may be compensated for. With the use of high lead threads on the stud and in the nut the fastener is very rapidly assembled.

The combined demands for a large amount of lateral floating movement, together with high lead threads on the bolt and nut for fast action, have led to problems in certain instances. This is because the necessary floating movement has required a substantial amount of clearance between the edges of lock member 24 and the walls of the inner receptacle 7. While clearance allows desirable floating movement, it also permits the nut to rotate relative to the inner receptacle until the corners of the lock member 24 contact the receptacle walls. When using a high lead thread, this can cause the bolt and nut to become loosened an unsafe amount. Even a partial turn to bring the corners of member 24 into engagement with the inner surface of the receptacle 7 can permit too much separation of the fastener. Such loosening occurs despite the fact that the ratchet teeth 26 on lock washer 24 and the end of the nut have remained in engagement without relative rotational movement. This difficulty is corrected by the version of the invention illustrated in FIGS. 12 through 16.

This modification of the invention includes a tab on the ratchet washer which engages a slot in the inner receptacle to prevent any material rotation of the ratchet washer relative to the receptacle units.

The outer receptacle may be identical to that in the previously described embodiments, riveted to the work or otherwise suitably secured as described above. Projecting upwardly from bottom wall 19 of the outer receptacle is a stud or bolt 53 having a square head 54 retained by the end wall of the outer receptacle. The inner side of the nut head 54 is adjacent the outer end wall 55 of inner receptacle assembly 56, and the shank 57 of the bolt extends through end aperture 58 of the inner receptacle assembly. The latter unit may be formed in two sections 59 and 60 which are held by a press fit within the outer receptacle unit 6. A large opening 61 is formed at the upper end 62 of the inner receptacle assembly to permit entry of the internally threaded nut member 63.

One corner 64 of the inner receptacle unit is flattened, as best seen in FIGS. 13 and 14, extending from the adjacent sides of the inner receptacle at an angle of 45°. This provides a clearance 65 at this corner between the inner and outer receptacle units, which otherwise are complementary. A slot 66 extends longitudinally of the inner receptacle unit at the corner 64 from the lower edge of element 59 to its upper end wall 62. This slot receives a tab 67 of ratchet lock washer 68, which otherwise basically is similar to the element 24 in the previously described embodiment. In other words, the lock washer 68 has a square or rectangular outer periphery having considerably smaller lateral dimensions than those of the interior of the inner receptacle unit 56. It is provided also with radial teeth 69 for engaging similar teeth 70 on the nut 63 to preclude rotation of the nut relative to the lock washer when the unit is in its engaged position. A spring 71 contacts the undersurface of the ratchet member 68 and biases it upwardly to engage end wall 62 of the inner receptacle when the fastener elements are separated as in FIG. 12.

This design permits a full floating movement between the ratchet member 68 and the receptacle assembly. A great deal of lateral movement in any direction is afforded by the proportioning of the edges of the ratchet member 68 with respect to the interior dimensions of the receptacle unit. Of course, the central opening 72 in member 68 is somewhat larger than the diameter of stud 53 so that the floating movement can take place. The tab 67 projecting through slot 66 in the upper member 59 of the inner receptacle unit does not prevent this floating action. The clearance 65 at corner 64 allows the tab 67 to extend beyond the periphery of the inner receptacle when in one extreme position, thereby increasing the amount of lateral movement possible. Nevertheless, this tab in the slot effectively precludes rotation of the lock washer relative to the receptacle assembly. The tab and slot are proportioned to allow free axial movement of lock member 68, yet little clearance is provided at this location. Therefore, while this design permits engagement between the bolt and nut even when there is substantial misalignment, allowing considerable floating movement, nevertheless it is impossible to loosen the nut on the bolt without causing relative rotation between the nut and the ratchet member. Hence, the inclusion of the tab in the slot assures that there cannot be a dangerous inadvertent loosening of the nut on the bolt. Only a reverse driving torque which will overcome the force of the ratchet on the end of the nut can cause the nut to be loosened from the fully engaged position.

The foregoing detailed description is to be clearly understood as given by way of illustration and example only, the spirit and scope of this invention being limited solely by the appended claims.

I claim:

1. A fastener for securing together two members having matching apertures therethrough comprising a stud assembly adapted for association with one of said members to be fastened, and a nut assembly adapted for association with the other of said members to be fastened, said stud assembly including a first receptacle having an open end and tab means projecting outwardly from said end for providing means to attach said first receptacle to said one member, a second receptacle fixedly received in said first receptacle, said second receptacle having a first end wall adjacent said open end of said first receptacle and a second and opposite end wall adjacent and spaced from the end of said first receptacle opposite said open end thereof, said end walls of said second receptacle having aligned apertures therethrough, a stud member in said receptacles, said stud member having a head portion received between said opposite end walls of said first and second receptacles, said first and second receptacles including means for retaining said head portion with freedom for limited lateral movement and for substantially precluding rotation thereof about the axis of said stud, and a threaded shank extending through said opening in said second end wall of said second receptacle to the interior of said second receptacle, a washer in said second receptacle around said shank of said stud, said washer being axially movable in said second receptacle, said second receptacle including means for substantially precluding rotational movement of said washer about its axis, said washer having radial teeth on the surface thereof adjacent said first end of said second receptacle, and a spring in said second receptacle biasing said washer toward said first end of said second receptacle, said nut assembly including a stud-receiving member having a head for engagement with said other member to be secured, and a shank extending therefrom for insertion through said apertures in said members to be fastened, said stud-receiving member having an axially extending threaded aperture in said shank for threadably receiving said shank of said stud, said stud receiving member being further provided with radial teeth on the end of said shank opposite said head for engagement with said teeth on said washer, whereby said washer by being urged against said end of said stud-receiving member by said spring offers resistance to rotation of said stud-receiving member, said stud-receiving member having an annular groove in the shank thereof, a circumferentially compressible split annular member for engagement with said shank of said stud-receiving member in said groove for preventing removal of said stud-receiving member from a member to be fastened with which said stud-receiving member is associated, and a radially expansible spring on said stud-receiving member for engaging said other member to be fastened and yieldably holding said stud-receiving member in a position with the head of said stud-receiving member spaced from the surface of said member to be secured.

2. A fastener comprising a stud assembly for association with one member to be fastened, said stud assembly including an outer receptacle having an open end attachable to said one member, an inner receptacle received in and frictionally retained by said outer receptacle, said inner receptacle having an opening in the end wall thereof adjacent said open end of said outer receptacle, a stud in said inner receptacle extending toward said opening therein, said stud and said receptacles having cooperating means for providing said stud with freedom for limited lateral movement and for precluding said stud from substantial rotational movement about its axis, an annular member in said inner receptacle on said stud, said annular member being dimensioned with respect to said inner receptacle and said stud such that said annular member has freedom for axial movement in said inner receptacle and freedom for limited lateral floating movement with respect to said inner receptacle, said annular member including a tab projecting outwardly therefrom, said inner receptacle including a longitudinally extending slot receiving said tab whereby said inner receptacle at said slot substantially precludes rotational movement of said annular member, and a spring in said inner receptacle urging said annular member toward said one end of said inner receptacle, said annular member having interfering means on the surface thereof adjacent said one end of said inner receptacle; and a nut for association with a second member to be fastened, said nut being insertable through said members to be fastened and into said inner receptacle through said opening in said end of said inner receptacle, said nut including interfering means for cooperating with said interfering means of said annular member for providing a resistance to the rotation of said nut.

3. A device as recited in claim 2 in which a clearance is provided between said inner and outer receptacles at said slot, whereby said tab on said annular member can extend through said slot beyond the periphery of said inner receptacle.

4. A fastener comprising a stud, said stud having a threaded shank and a laterally projecting head at one end of said shank; support means for said stud, said support means including a receptacle unit adapted for attachment to a workpiece to be fastened, said receptacle unit having an outer end wall in juxtaposition with the outer face of said head, and a second wall adjacent and parallel to said end wall, said second wall including an aperture therethrough through which said shank extends, said second wall being in juxtaposition with the inner face of said head, said receptacle unit being of larger cross sectional dimension than the lateral dimension of said head to permit limited relative floating movement of said stud, said receptacle unit including wall portions interferingly engageable with said head to preclude substantial relative rotation of said stud, said receptacle unit having an opposite end wall provided with an aperture therethrough; a ratchet member in said receptacle unit between said second wall and said opposite wall and retained in said receptacle unit by said opposite wall, said ratchet member extending around said shank and having a serrated surface adjacent said opposite wall, said receptacle unit being of larger cross sectional dimension than the lateral dimension of said ratchet member to permit limited relative floating movement of said ratchet member in said receptacle unit, said receptacle unit and said ratchet member having cooperative tongue and groove means for permitting said limited lateral floating movement of said ratchet member relative to said receptacle unit while precluding substantial rotation of said ratchet member relative to said receptacle unit; a spring in said receptacle unit biasing said ratchet member toward said opposite wall; and a nut adapted for association with a second member to be fastened, said nut including a threaded aperture and a serrated end wall, said threaded aperture being threadably engageable with said shank and said serrated end wall being engageable with said serrated surface of said ratchet member, whereby said serrations cooperate to provide a resistance to relative rotation between said nut and said ratchet member for thereby precluding inadvertent relative rotation thereof.

5. A fastener comprising a stud assembly for association with a member to be fastened, said stud assembly including receptacle means adapted for attachment to said member; a threaded member in said receptacle means; and a nut assembly adapted for association with another member to be fastened, said nut assembly including means insertable into said receptacle means and having a threaded recess for engaging said threaded member, and means for engaging said other member to be fastened to retain said nut assembly thereto, said receptacle means including a first receptacle having a closed end, and an opposite open end provided with tabs thereon for attachment to a member to be fastened, and a second receptacle frictionally held in said first receptacle, said second receptacle having an opening in either end thereof, one of said ends of said second receptacle being adjacent said open end of said first receptacle for receiving said nut therethrough, the other of said ends of said second receptacle including a wall adjacent and closely spaced from said closed end of said first receptacle, said threaded member including a head portion received between said other end of said second receptacle and said closed end of said first receptacle, said threaded member having a threaded shank extending through the opening in said other end to the interior of said second receptacle for threadably engaging said nut when said nut is received in said one end of said second receptacle, said first receptacle including flat inner wall portions and said head including flat outer edge portions of smaller overall dimensions than the dimensions of said inner walls for permitting floating movement of said head and precluding rotation of said stud upon interengagement of said inner wall portions and said edge portions, said second receptacle being provided with flat inner wall portions, and rotation resisting means in said receptacle means, said nut assembly including means for engaging said rotation resisting means for precluding inadvertent rotation of said nut relative to said threaded member, said rotation resisting means including a washer provided with flat outer edge portions of smaller lateral dimensions than the spacing of said inner walls of said second receptacle, the diagonal dimensions of said head and said washer being greater than the dimension between said inner wall portions of said first and second receptacles respectively.

6. A fastener comprising a stud assembly for association with one member to be fastened, said stud assembly including an outer receptacle having an open end attachable to said one member, an inner receptacle received in and frictionally retained by said outer receptacle, said inner receptacle having an opening in the end wall thereof adjacent said open end of said outer receptacle, a stud in said inner receptacle extending toward said opening therein, said stud and said receptacle having cooperating means for providing said stud with freedom for limited lateral movement and precluding said stud from substantial rotational movement about its axis, a washer retained in said inner receptacle with freedom for axial movement therein and substantially precluded from rotation about its axis, and a spring in said inner receptacle urging said washer toward said end of said inner receptacle, said washer having interfering means on the surface thereof adjacent said end of said inner receptacle; and a nut for association with a second member to be fastened, one end portion of said nut being insertable through said members to be fastened and into said inner receptacle through said opening in said end of said inner receptacle, said nut including interfering means on the outer wall of said end portion for cooperation with said interfering means of said washer for providing a resistance to the rotation of said nut, said nut being provided with a head on one end and a shank projecting axially therefrom, said shank having a circumferential groove therein adjacent the opposite end thereof, said groove having a substantially radial side wall adjacent said opposite end and an additional side wall tapering outwardly toward said head, a split annular ring on the exterior of said shank having a free dimension such that said ring is adapted to enter said groove, said ring having a radial dimension such that said ring projects beyond the periphery of said shank when said ring is so received for retaining said nut to a member to be fastened, and an axially extending leaf spring on said shank, said shank having an additional groove dimensioned to entirely receive said leaf spring, said leaf spring having a free dimension such that said leaf spring normally projects beyond the periphery of said shank.

7. A fastener comprising a stud assembly for association with a member to be fastened, said stud assembly including receptacle means adapted for attachment to said member, a threaded member in said receptacle means, said receptacle means including means for holding said threaded member with freedom for limited movement but with said threaded member precluded from substantial rotation about its axis relative thereto, and a ratchet washer in said receptacle means, said ratchet washer having an aperture slidably receiving said threaded member, said ratchet washer including radial teeth on one side thereof and being provided with a projecting element engaging said receptacle means for substantially precluding rotation of said ratchet washer, the lateral dimensions of said ratchet washer being less than the lateral dimensions of the interior of said receptacle means whereby said ratchet washer is capable of lateral floating movement within said receptacle means, and a resilient element biasing said ratchet washer toward one end of said receptacle means; and a nut adapted for association with another member to be fastened, said nut being insertable into said receptacle and including an end surface having radial teeth for engaging said radial teeth on said surface of said ratchet washer, whereby said ratchet washer precludes inadvertent rotation of said nut, said receptacle means including an inner receptacle element and an outer receptacle element, said inner receptacle element being retained in said outer receptacle element and having straight flat sides defining a substantially rectangular cross section with the exception that one corner portion thereof is of finite lateral dimensions extending at an angle to the adjoining sides of said inner receptacle, said outer receptacle being complementary to said inner receptacle with the exception of said corner portion of said inner receptacle whereby a clearance is provided between said inner and outer receptacles at said corner portion, said inner receptacle including a longitudinally extending slot at said corner, said projecting element of said ratchet washer being a tab slidably received in said slot and substantially complementry to said slot in lateral dimension, whereby said inner receptacle and said tab preclude substantial rotation of said ratchet washer with respect to said inner receptacle.

8. A fastener for securing together two members having matching apertures therethrough comprising a stud assembly adapted for association with one of said members to be fastened, and a nut assembly adapted for association with the other of said members to be fastened, said stud assembly including a first receptacle having an open end and tab means projecting outwardly from said end for providing means to attach said first receptacle to said one member, a second receptacle fixedly received in said first receptacle, said second receptacle having a first end wall adjacent said open end of said first receptacle and a second and opposite end wall adjacent and spaced from the end of said first receptacle opposite said open end thereof, said end walls of said second receptacle having aligned apertures therethrough, a stud member in said receptacles, said stud member having a head portion received between said opposite end walls of said first and second receptacles, said first and second receptacles including means for retaining said head portion with freedom for limited lateral movement and for substantially precluding rotation thereof about the axis of said stud, and a threaded shank extending through said opening in said second end wall of said second receptacle to the interior of said second receptacle, a washer in said second receptacle around said shank of said stud, said washer being axially movable in said second receptacle and of smaller lateral dimensions than the inner lateral dimensions of said second receptacle for permitting lateral floating movement of said washer within said second receptacle, said washer having radial teeth on the surface thereof adjacent said first end of said second receptacle, and a spring in said second receptacle biasing said washer toward said first end of said second receptacle, said nut assembly including a stud-receiving member having a head for engagement with said other member to be secured, and a shank extending therefrom for insertion through said apertures in said members to be fastened, said stud-receiving member having an axially extending threaded aperture in said shank for threadably receiving said shank of said stud, said stud-receiving member being further provided with radial teeth on the end of said shank opposite said head for engagement with said teeth on said washer, whereby said washer by being urged against said end of said stud-receiving member by said spring offers resistance to rotation of said stud-receiving member, said stud-receiving member having an annular groove in the shank thereof, a circumferentially compressible split annular member for engagement with said shank of said stud-receiving member in said groove for preventing removal of said stud-receiving member from a member to be fastened with which said stud-receiving member is associated, said washer having an outwardly projecting tab, said second receptacle having a longitudinally extending slot slidably receiving said tab for precluding rotation of said washer about its axis while permitting said lateral floating movement thereof.

9. A fastener comprising a stud assembly; and a nut assembly, said stud assembly including a first housing having substantially planar longitudinally extending sides, a first closed end and a second open end, said first housing having flanges extending laterally outwardly from opposite sides at said second end for attachment to a workpiece to be fastened, a second housing, said second housing having planar longitudinally extending side walls, said side walls of said second housing being complementary to and frictionally retained within said side walls of said first housing, said second housing having a first end in spaced parallelism with said first end of said first housing, and having a second end substantially in alignment with said second end of said first housing, said first and second ends of said second housing having apertures therethrough, a stud having a threaded shank extending through said apertures, and a head interposed between said first end of said second housing and said first end of said first housing, said threaded shank being smaller in diameter than the transverse dimensions of said apertures, said head having straight outer edge portions, and being of smaller transverse dimension than the transverse dimension between said planar side walls of said first housing, whereby said stud is retained in said first and second housings in a floating relationship therewith, a washer circumscribing said shank intermediate said end walls of said second housing, said washer having a serrated radial face adjacent said second end of said second housing, said washer having a smaller transverse dimension than the transverse dimension between said planar side walls of said second housing, whereby said washer is transversely floatingly received in said second housing, said washer and second housing having cooperating tongue-and-groove means for precluding substantial rotation of said washer relative to said second housing, and a compression spring biasing said washer toward said second end of said second housing, said nut assembly including a nut member having a head at one end and an axially inwardly extending threaded aperture at the other, said threaded aperture being adapted to threadably engage said shank of said stud, said other end of said nut member having a serrated end wall outwardly of said aperture therein, said serrated end wall of said nut being adapted to engage said serrated face of said washer for resisting relative rotation of said serrated end wall and said serrated face, said nut member having an annular groove inwardly of said end wall, and including an annular retaining means circumscribing said nut and slidable relative thereto for retaining said nut to a workpiece, said annular retaining means being adapted to enter said annular groove.

10. A device as recited in claim 9 in which for said cooperating tongue-and-groove means said second housing includes a wall portion spaced inwardly from the adjacent side wall of said first housing, said side wall portion of said second housing having a longitudinally extending slot therein, said washer having a tab extending through said slot into the space between said side wall portion and said adjacent side wall portion of said first housing.

References Cited by the Examiner
UNITED STATES PATENTS

| 544,507 | 8/95 | Gillette | 151—13 |
| 1,509,948 | 9/24 | Hall | 151—41 |
| 2,742,072 | 4/56 | Murphy | 151—9 |
| 2,756,796 | 7/56 | Murphy | 151—9 |
| 2,866,372 | 12/58 | Fisher | 151—41.72 |
| 2,972,367 | 2/61 | Wootton | 151—69 |
| 2,991,816 | 7/61 | Harbison et al. | 151—69 |
| 2,995,793 | 8/61 | Griffiths | 24—221.2 |
| 3,037,542 | 6/62 | Boyd | 151—69 |

FOREIGN PATENTS 773,814  5/57  Great Britain.

EDWARD C. ALLEN, *Primary Examiner.*